June 26, 1962 T. W. BROOKE-SMITH 3,041,018
AIRCRAFT ADAPTED FOR VERTICAL TAKE-OFF AND LANDING
Filed April 14, 1959 2 Sheets-Sheet 1

Inventor
Thomas Wm. Brooke-Smith
By Cushman, Darby & Cushman
Attorneys

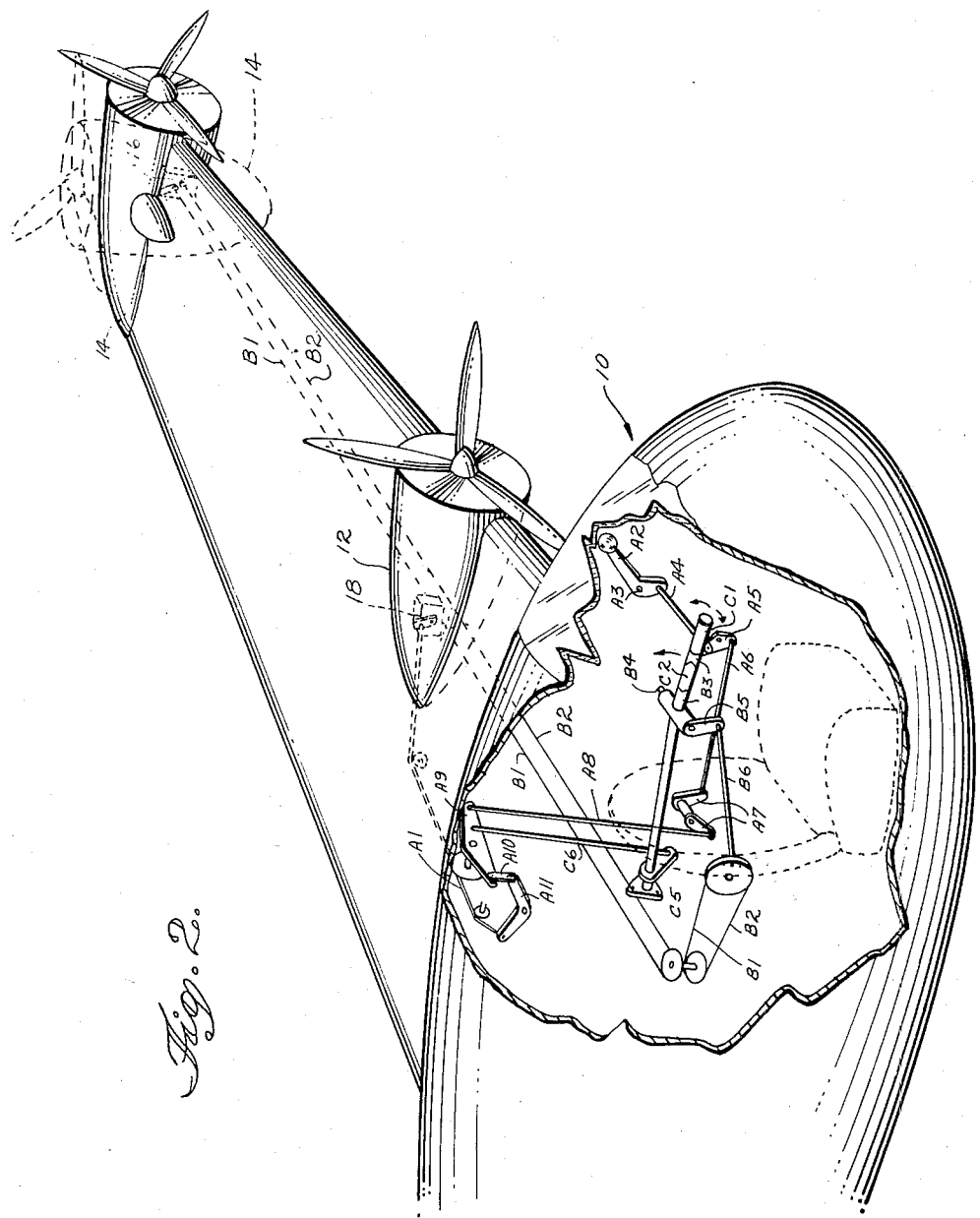

United States Patent Office 3,041,018
Patented June 26, 1962

3,041,018
AIRCRAFT ADAPTED FOR VERTICAL TAKE-OFF AND LANDING
Thomas W. Brooke-Smith, Cultra, Northern Ireland, assignor to Short Brothers & Harland Limited, Queens Island, Belfast, Northern Ireland
Filed Apr. 14, 1959, Ser. No. 806,279
Claims priority, application Great Britain Apr. 18, 1958
1 Claim. (Cl. 244—83)

The invention has reference to aircraft which in addition to the conventional forward propulsion engine or engines, are provided with one or more auxiliary engines which are so mounted as to provide a vertical upward thrust for vertical take-off and landing and which may be capable of being tilted about a transverse axis (or axes) so as to provide a component of forward thrust to supplement the thrust of the propulsion engine, or of rearward thrust to provide braking effort, during the transitional stages between pure vertical movements and normal forward flight.

This invention provides means whereby the pilot of such an aircraft, may, using one hand only, operate the throttle controls of both the propulsion engines and the auxiliary lifting engines, as desired, and for this purpose it is proposed that there should be provided in the cockpit a lever which is connected to the lifting engine throttle control in such manner that the degree of throttle opening is dependent upon the angular position of said lever, said lever carrying a twist-grip handle which is connected to the propulsion engine throttle control in such manner that the degree of throttle opening is dependent upon the rotational position of said handle.

The twist-grip handle is interconnected with the conventional propulsion engine throttle lever or levers, so that the latter is or are actuated simultaneously with the operation of the twist-grip handle.

The aforesaid lever may be mounted at the side of the pilot's seat, in a position convenient for the left hand, so that it may pivot in a fore-and-aft direction about a transverse axis. During transition from vertical to forward flight, the pilot may operate the propulsion engine throttle by means of the twist-grip handle without removing his hand from the lever. Only when vertical flight has ceased, and the propulsion engines are operating fully, need the hand be transferred to the conventional throttle levers when throttle adjustments are required.

FIGURE 2 is a fragmentary diagrammatic perspective view illustrating an aircraft incorporating the control assembly of FIGURE 1.

Figure 1:
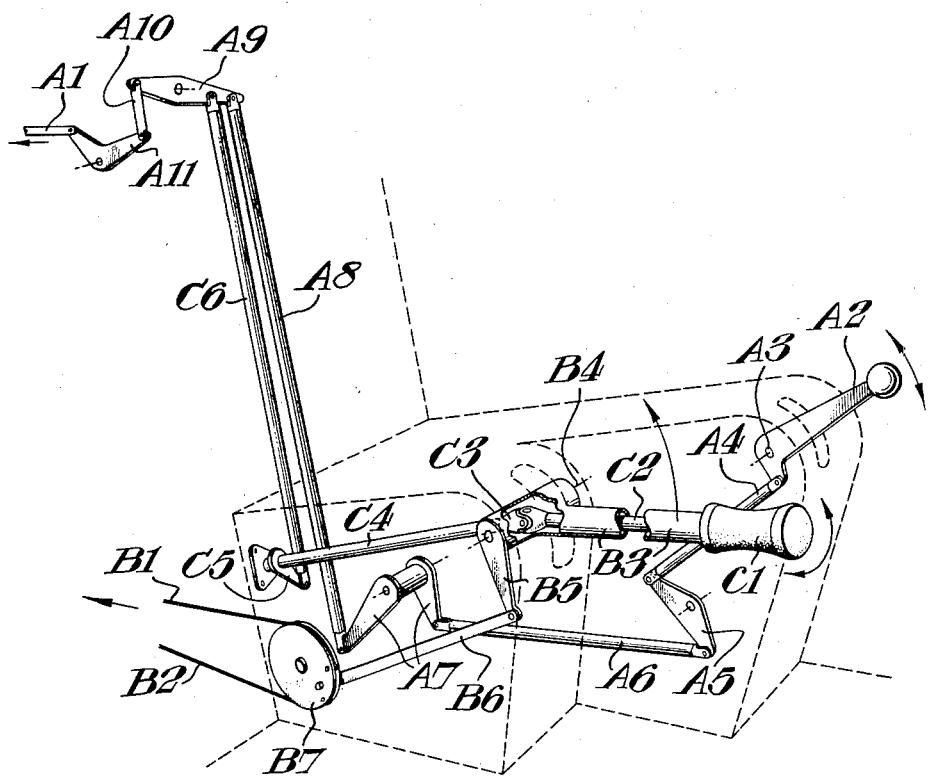
FIGURE 1 is a diagrammatic perspective view of the present invention illustrating the pilot's throttle control assembly in the cockpit of an aircraft.

The aircraft 10 to which the invention is applied is propelled conventionally in the forward direction by an engine 12 or engines of which the throttle, represented schematically by the numeral 18, is controlled through the medium of the push-pull linkage member A1. The aircraft is also provided with one or more auxiliary engines 14 which are mounted in the region of the centre of gravity of the aircraft in such manner as to exert a vertical upward thrust for vertical take-off and landing (as shown in broken lines), said auxiliary engine 14 (or engines) (hereinafter termed the "lift engines") being capable of being tilted (as shown in full lines) about a transverse axis (or axes) so as to provide a component of forward thrust supplementing that of the propulsion engine, or of rearward thrust to provide braking effort, during the transitional stages between pure vertical manoeuvres and normal forward flight. The throttle, represented schematically by the numeral 16, of said lift-engines 14 is controlled through the medium of a pair of tension wires B1, B2.

In ordinary forward flight the propulsion engine throttle connection A1 is operated by a lever A2 pivotally mounted at A3, and its movements are transmitted through a link A4, a double-armed lever A5, a link A6, a bell-crank lever assembly A7, a link A8, a double-armed lever A9, a link A10 and a bell-crank lever A11, to which latter the linkage member A1 is connected.

The lift engine throttle connections B1, B2, and operated by a lever B3 which is mounted for pivotal movement about a transverse axis B4, and which carries an arm B5 which is in turn connected to a link B6 which is coupled to a wheel B7 to which said wires B1, B2 are attached.

In order that the pilot may open or close the propulsion engine throttles 18 simultaneously with the variation of the lift engine throttles 16 during transition from vertical to forward flight (or vice versa), by the same hand as is used for the lift engine throttles 16, the lever B3 is provided with a handle C1 which is fixed to a shaft C2 mounted rotatably within the lever B3 and connected by a universal coupling C3 to a shaft C4 which carries an arm C5 linked by the member C6 with the double armed lever A9 by which movement is transmitted to the propulsion engine throttle linkage member A1 when operated by the lever A2.

Thus, by a rotational movement of the handle C1 the pilot may vary the throttle setting of the propulsion engines 12 whilst with the same hand controlling the propulsion engine throttle by a pivotal movement of the lever B3 about the axis B4, without removing his hand from the handle C1. Only when vertical flight has ceased, and the propulsion engines 12 are operating fully, need the pilot's hand be transferred to the propulsion engine throttle lever A2.

What I claim as my invention and desire to secure by Letters Patent is:

For use with aircraft having at least one forward propulsion engine and one lift engine capable of being tilted about a horizontal axis, the improvement in a control system comprising a manually operable throttle means including independently and simultaneously operable control members capable of operation by one hand, one of said throttle control members comprising a lever pivotally mounted for angular movement on a fixed axis at a right angle to the longitudinal axis of the same, the other of said throttle control members including a rotary member rotatably mounted on said lever and having an axis of rotation coincident with the longitudinal axis of said lever, means connecting said lever to the throttle of one of said engines so that pivotal movement of said lever about said fixed axis controls the same, and means connecting said rotary member to the throttle of the other of said engines so that rotation of the same controls the throttle of said other engine, said last-mentioned means including a universal coupling operatively connected to said rotary member, said universal coupling being carried on the fixed pivotal axis of said lever, and linkage connected to the throttle of said other engine and to said universal coupling.

References Cited in the file of this patent

UNITED STATES PATENTS

| | | |
|---|---|---|
| 1,454,505 | Christen | May 8, 1923 |
| 1,754,571 | Podolsky | Apr. 15, 1930 |
| 1,889,295 | Rosatelli | Nov. 29, 1932 |
| 2,313,768 | Putt | Mar. 16, 1943 |
| 2,398,601 | Seifert | Apr. 16, 1946 |
| 2,460,374 | Walls | Feb. 1, 1949 |